United States Patent
Ravid et al.

(10) Patent No.: US 7,393,039 B2
(45) Date of Patent: Jul. 1, 2008

(54) ENERGY ABSORBING DEVICE FOR A VEHICLE SEAT

(75) Inventors: Moshe Ravid, Hod Hasharon (IL); Shlomo Birger, Nazrat Elit (IL)

(73) Assignee: Plasan Sasa Agricultural Cooperative Society Ltd., M.P. Marom Hagalil (IL)

( * ) Notice: Subject to any disclaimer, the term of this patent is extended or adjusted under 35 U.S.C. 154(b) by 92 days.

(21) Appl. No.: 11/081,831

(22) Filed: Mar. 17, 2005

(65) Prior Publication Data

US 2006/0076809 A1 Apr. 13, 2006

(30) Foreign Application Priority Data

Mar. 18, 2004 (IL) ...................... 160939

(51) Int. Cl.
*B60N 2/02* (2006.01)
*F41H 7/02* (2006.01)

(52) U.S. Cl. ............ 296/68.1; 296/187.03; 296/187.05; 297/216.1; 280/751; 89/36.08

(58) Field of Classification Search ................ 296/68.1, 296/187.03, 187.05; 293/102, 132, 133, 293/135, 136, 137; 188/377; 297/216.1, 297/216.17; 89/36.08; 280/751
See application file for complete search history.

(56) References Cited

U.S. PATENT DOCUMENTS

| | | | |
|---|---|---|---|
| 3,606,452 A | 9/1971 | Riffe et al. | |
| 4,204,659 A * | 5/1980 | Phillips et al. | ............... 248/562 |
| 4,336,868 A | 6/1982 | Wilson et al. | |
| 5,035,307 A | 7/1991 | Sadeghi et al. | |
| 5,758,859 A | 6/1998 | Gonzalez | |
| 5,813,649 A | 9/1998 | Peterson et al. | |
| H1833 H | 2/2000 | Hoppel et al. | |
| 6,520,541 B1 | 2/2003 | Cantor | |
| 6,698,331 B1 | 3/2004 | Yu et al. | |
| 2003/0160480 A1 | 8/2003 | Allera et al. | |

FOREIGN PATENT DOCUMENTS

| | | |
|---|---|---|
| DE | 40 11 963 A1 | 10/1990 |
| DE | 422 22 22 | 1/1994 |
| DE | 101 30 632 | 1/2003 |
| DE | 10 2004 054 962 A1 | 5/2006 |
| WO | 92/06003 A1 | 4/1992 |
| WO | 93/01950 A2 | 2/1993 |

* cited by examiner

*Primary Examiner*—Joseph D. Pape
(74) *Attorney, Agent, or Firm*—The Nath Law Group; Jerald L. Meyer; Jonathan A. Kidney (57) ABSTRACT

An energy absorbing device for reducing acceleration transmitted to a seated occupant in a vehicle as a result of a high energy impact. The device comprises a first energy absorbing mechanism having a first dimension in the impact direction and capable of undergoing predetermined elastic deformation in that direction; and a second energy absorbing mechanism having a second dimension in the impact direction, which is smaller than the first dimension by a distance corresponding to that elastic deformation. The second mechanism is loaded with the impact force after the first mechanism has undergone elastic deformation; the second mechanism comprises a material capable of progressive deformation. The device may comprise a restriction mechanism connecting the two plates, adapted to restrict displacement of the first plate relative to the second plate in any direction different from the impact direction.

28 Claims, 5 Drawing Sheets

ENERGY ABSORBING DEVICE FOR A VEHICLE SEAT

FIELD OF THE INVENTION

This invention relates to devices for, and methods of, absorbing energy of a high energy impact such as associated with an explosion, e.g. a mine blast, or crash situations, by attenuating forces generated by the impact. The invention particularly refers to the use of such devices and methods in a vehicle for the reduction of amount of acceleration transmitted to a seated occupant in the vehicle as a result of an explosion or sudden impact.

BACKGROUND OF THE INVENTION

Force attenuation devices of the above kind are used, for example, in military vehicles such as tanks, jeeps, airplanes, helicopters or the like, which have a floor and a seat, where the devices are mounted between the floor and the seat. The devices often include elements which, under high energy impact, undergo permanent deformation or crushing. Such elements are often made of a metal material or of a material capable of progressive deformation such as a composite fibrous material.

U.S. Pat. No. 4,336,868 and U.S. Pat. No. 5,035,307 are two examples of publications disclosing devices of the above kind. U.S. Pat. No. 4,336,868 discloses an apparatus for the attenuation of high velocity impact landing forces, utilizing an energy absorbing tube made of composite fibrous material, which is progressively crushed by a force applying structure, to dissipate energy. U.S. Pat. No. 5,035,307 discloses an energy absorbing device designed for similar purposes, which also uses an energy absorbing tube comprising fiber reinforced plastics material.

US Statutory Invention Registration No. H1,833 discloses the use of a plurality of crushable or foldable tube elements made of a composite, to reduce the amount of force and acceleration transmitted to a seated occupant in a military vehicle, subject to the shock of a land mine explosion. The tubes are placed between the vehicle floor and the seat so that, as the floor moves due the blast loading, the crushable tubes will progressively deform, or the foldable tubes will progressively fold, absorbing the energy of the blast and reducing the acceleration transmitted to the seated occupant. In one embodiment disclosed in H1,833 the tubes are aligned concentrically and one of them is higher than the other, for the higher tube to be loaded before the lower tube, whereby the deformation rate can be controlled such that, if one of the tubes fails to absorb the required energy, the other tube becomes more stiff as it deforms, thus absorbing the required energy.

It has also been suggested to use energy absorbing elements in non-military vehicle safety seat systems. For example, U.S. Pat. No. 6,520,541 and U.S. Pat. No. 2003/0160480 disclose the use of progressive deformation elements made of aluminum foam, which is known to be rate sensitive, i.e. to be easier compressible when force is applied to it more slowly.

SUMMARY OF THE INVENTION

In accordance with one aspect of the present invention, there is provided an energy absorbing device for reducing acceleration transmitted to a seated occupant in a vehicle as a result of a force of a high energy impact acting thereon in an impact direction, the device comprising a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has at least partially undergone said elastic deformation, said second mechanism preferably comprising a material capable of progressive deformation.

The predetermined amount of elastic deformation may be equal or less than the maximal available amount of such deformation in the material from which the first mechanism is made.

By progressive deformation of the second mechanism, a deformation is meant which, contrary to regular plastic deformation, does not lead to simultaneous crushing of the entire mechanism, but rather successively compresses it, such that uncompressed portions of the mechanism maintain their integrity until they are compressed.

Due to the design of the energy absorbing device according to the present invention, it may be ensured that when the device is subjected to a high energy impact, the impact's energy will start to be absorbed in the process of the elastic deformation of the first energy absorbing mechanism, and the energy absorption will be subsequently continued, at least in part, in the process of progressive deformation of the second energy absorbing mechanism. Preferably, the latter process takes place simultaneously with plastic deformation of the first energy absorbing mechanism succeeding its elastic deformation. The device according to the present invention is thus capable of reduction of the acceleration transmitted to a seated occupant of a vehicle to a level not exceeding an acceptable level of acceleration for a constrained seated occupant during predetermined amount of time.

The device of the present invention is particularly useful to absorb energy of an impact whose direction is normal to a vehicle's floor. The device is thus adapted for mounting between the floor and the seat, and it comprises a lower plate to be attached to the floor, an upper plate to be attached to the seat, said first energy absorbing mechanism extending between the plates with its two ends attached to the plates, and the second energy absorbing mechanism is attached to the lower plate with its one end and having the other end spaced from the upper plate to the distance corresponding to said amount of elastic deformation of the first energy absorbing mechanism.

The first energy absorbing mechanism may be in the form a plurality of peripherally located spaced apart first energy absorbing elements surrounding a centrally disposed second energy absorbing mechanism. The first energy absorbing elements are preferably spaced from the second energy absorbing mechanism so that, when they are deformed, they do not contact the second mechanism.

Each of the first energy absorbing elements may be designed to have special deformation area or areas, about which their elastic and plastic deformation takes place. For example, the first elements may be thin panels, made of a material capable of the required elastic deformation, attached with their ends to the upper and lower plates of the device adjacent two opposite edges thereof, and bent in the middle. There may be two or more of such elements, provided that they are spaced from each other so that their total length along the edges of each of the upper and lower is smaller than the perimeter of the plates. It is desirable that the elements be disposed symmetrically with respect to the impact direction.

The elements may be located along each edge of the upper and lower plate or they may be located only along one pair of opposite edges.

The first energy absorbing elements in fact function as legs of the seat, and they therefore should be designed so as to be strong enough to withstand, when the vehicle is in its normal use, during the life time of the vehicle, loads exerted thereon by the weight of a seated occupant and the weight of the seat, while allowing relatively small normal repeated elastic movements of the seat and heavier loads, caused for example by the use of the vehicle under off-road conditions, and to be capable of the required greater elastic deformation under a high energy impact.

The second energy absorbing mechanism may be in the form of at least one solid second energy absorbing element capable of progressive deformation. The cross-sectional area of the second mechanism is preferably 4-10% of the area of each of the upper and lower plates, the latter area corresponding to the area of the seat. The second absorbing element may be made of layers of one material or different materials and/or it may have a varying cross-section, to control the process of its progressive deformation.

The second energy absorbing element is preferably provided with a relatively thin and relatively hard resilient spacer located between the second element and the lower plate, adapted to damp forces that may be exerted from below the vehicle on the second element during continuous normal use of the vehicle, and thereby to protect the second element from being destroyed at the place of its contact with the lower plate, as a result of such forces. The second element may also be provided with a more resilient and thicker pad mounted in the space between the second element and the upper plate to ensure that, during the life time of the vehicle, the second element not be damaged by repeated elastic movements of the seat with an occupant thereon.

According to another aspect of the present invention, there is provided an energy absorbing device for reducing acceleration resulting from a force of high energy impact acting on one side of the device in an impact direction. The device comprises a first plate at the one side, a second plate at the other side, both plates being transverse to the impact direction, and an energy absorbing mechanism extending between the plates. The device further comprises a restriction mechanism connecting the two plates and adapted to restrict displacement of the first plate relative to the second plate at least in one direction different from the impact direction but allowing substantially free displacement of the first plate in the impact direction.

The restriction mechanism may be adapted to restrict the displacement in a direction perpendicular to the impact direction, or to restrict rotational displacement about an axis parallel to impact direction, or to restrict the displacement opposite to the impact direction, or preferably to restrict the displacement in any direction different from the impact direction.

In one embodiment, the restriction mechanism comprises mechanical links connecting the two plates of the device. The links are adapted to work substantially only in tension, such that they can resist either to shear loads applied to the first plate relative to the second plate, or to axial loads urging the two plates apart from one another, or to both such shear and axial loads, without resisting to loads urging the two plates towards one another. Such device for example may be used in a vehicle, the first plate being under the seat of an occupant of the vehicle and the second plate being attached to the floor of the vehicle.

The restriction mechanism preferably comprises a plurality of such links disposed in various diagonal directions such that the plurality of diagonal links can resist shear loads if applied in any direction. Some of the links may be orientated parallel to the impact direction.

Preferably, the links are pre-tensioned. More preferably, they are pre-tensioned such that shear loads exerted by the plurality of diagonal links on the two plates essentially balance each other.

The links may have pre-tensioning means such as a threaded nut and bolt pair. The links may be made of the following: flexible wire, twisted multi-wire cable, knitted cable, woven band, chain. Also the links may be at least partially thin rods or strips made integral with any one of the plates.

BRIEF DESCRIPTION OF THE DRAWINGS

In order to understand the invention and to see how it may be carried out in practice, two embodiments of the invention will now be described, by way of non-limiting examples only, with reference to the accompanying drawings, in which.

DETAILED DESCRIPTION OF THE DRAWINGS

Figure 1:
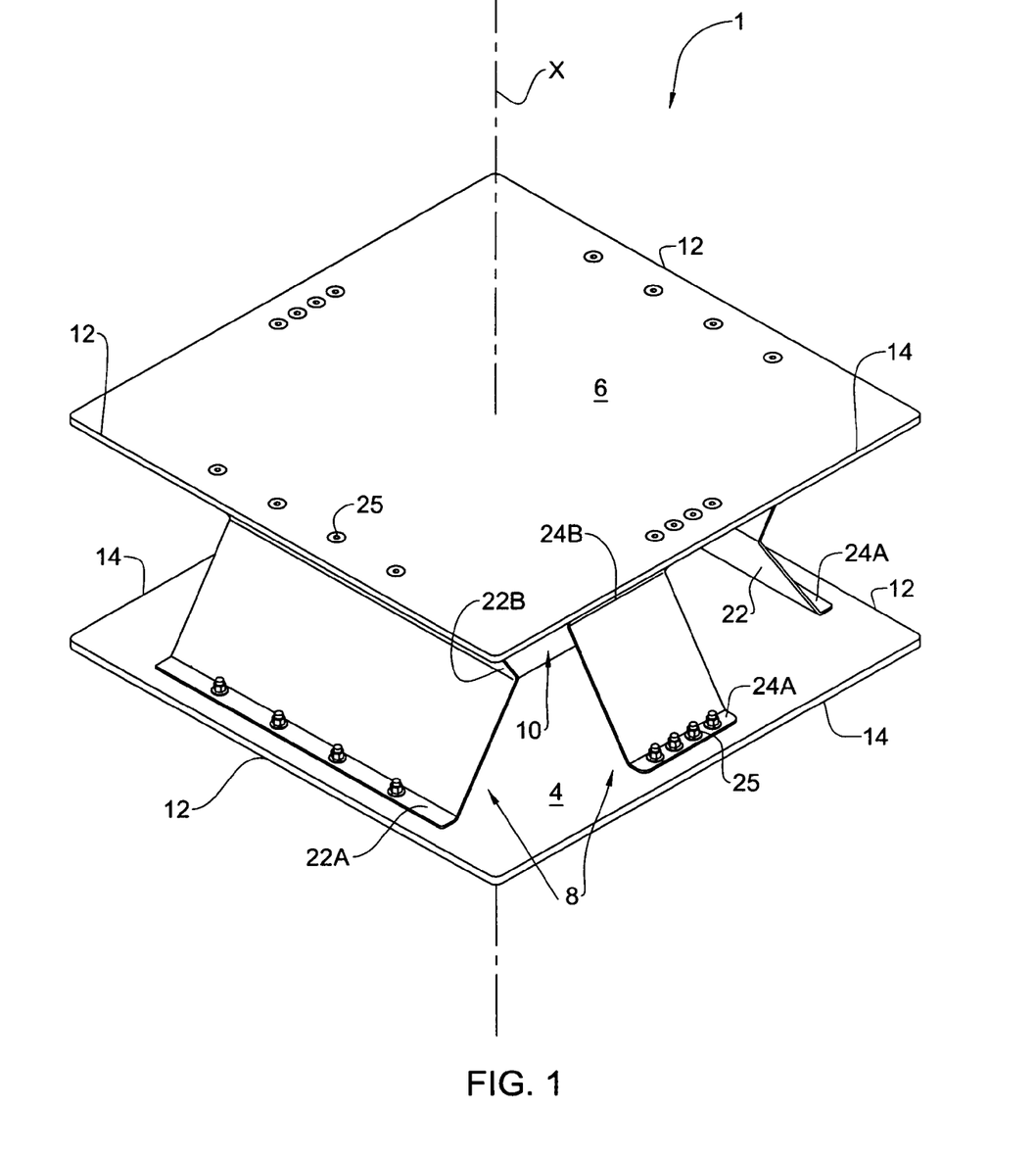
FIG. 1 is a perspective view of one example of an energy absorbing device designed according to the present invention.

With reference to FIG. 1, a device 1 is designed according to the present invention, for reducing acceleration transmitted to a seated occupant in a vehicle (not shown) as a result of a force of a high energy impact, such as a mine blast, acting thereon along an axis X of the device. The vehicle comprises a floor and a seat and the device 1 is adapted for being mounted therebetween. Consequently, the device's height H (see FIG. 3) equals the distance between the vehicle's floor and seat.

The device 1 comprises a lower plate 4, an upper plate 6, a first, peripherally located energy absorbing mechanism generally designated as 8, and a second, centrally located energy absorbing mechanism generally designated as 10. The lower plate 4 is adapted to be attached to the vehicle's floor, and the upper plate 6 is adapted to be attached to the vehicle's seat, by any means and in any manner known in the art. The upper and lower plates in the device 1 have each two pairs of opposite edges 12 and 14. Though the plates 4 and 6 are shown to have a square shape, their shape may be of any other configuration, regular or not, in accordance with the vehicle design.

The first energy absorbing mechanism 8 comprises a pair of peripheral legs 22 extending along the edges 12 of the upper and lower plates 4 and 6, and a pair of legs 24 (only one being seen in FIG. 1) extending along the edges 14 of the upper and lower plates. Each leg 22, 24 has lower end portion 22A, 24A, respectively, attached to the lower plate 4 adjacent its respective edges 12 and 14, and an upper end portion 22B, 24B, respectively, attached to the upper plate 6 adjacent its respective edges 12 and 14. The attachment may be performed by any appropriate attachment means such as screws or bolts 25.

The legs 22 and 24 are preferably made of metal such as, e.g. stainless steel or aluminum. The location of the legs may be different from that shown, in the drawings e.g. the legs may be associated with corners of the upper and lower plates, at which the edges 12 and 14 merge. Also, the number of legs does not have to be as shown, e.g. there may be no legs 24 or there may be more than two legs 22. However, an essentially even distribution of the legs around the axis X may be preferable to ensure stability of the seat in any direction perpendicular to the axis X.

Figure 2:
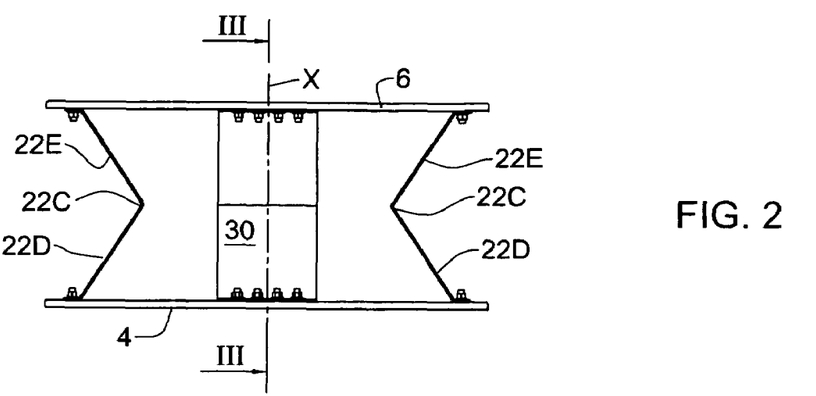
FIG. 2 is a side view of the device shown in FIG. 1.
Figure 3:
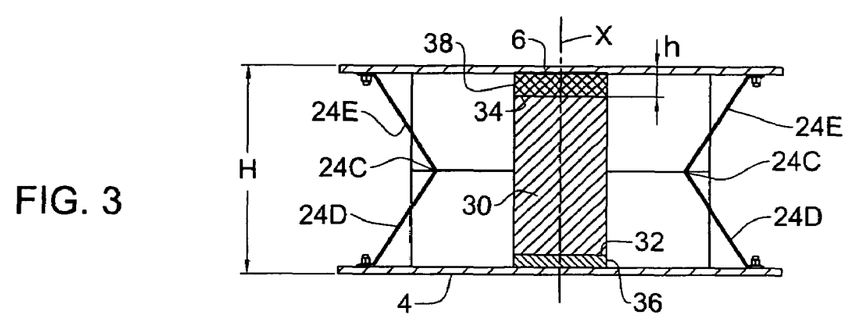
FIG. 3 is a cross-sectional view of the device shown in FIG. 1, taken along line III-III in FIG. 2.

As seen in FIGS. 2 and 3, the legs 22 and 24 are each in the form of a panel bent in the middle to form an angle a with an apex 22C, 24C between its lower part 22D, 24D disposed adjacent the lower plate 4 and its upper part 22E, 24E disposed adjacent the upper plate 6. The angle $\alpha$ exceeds 90° and it is preferably in the range between 100° and 140°. The fold of the legs 22 and 24 in the vicinity of their respective apexes 22C and 24C is rounded and it is adapted to function as a so-called 'plastic hinge' about which the plates may be first deformed elastically, to a predetermined extent $\Delta H_{elast}$ under a predetermined high impact force, and then plastically. It should be noted that the legs 22 and 24 may be bent in more than one location and that the 'plastic hinge' area does not necessarily need to be in the middle of the legs. Preferably, the apexes 22C and 24C are located at such a distance from the second energy absorption mechanism 10 as to ensure that when the legs 22 and 24 collapse to a maximal designed extent, the apexes 22C and 24C will not contact the second energy absorbing mechanism 10. The design of the legs 22 and 24 may differ from that of the legs.

Figure 4:
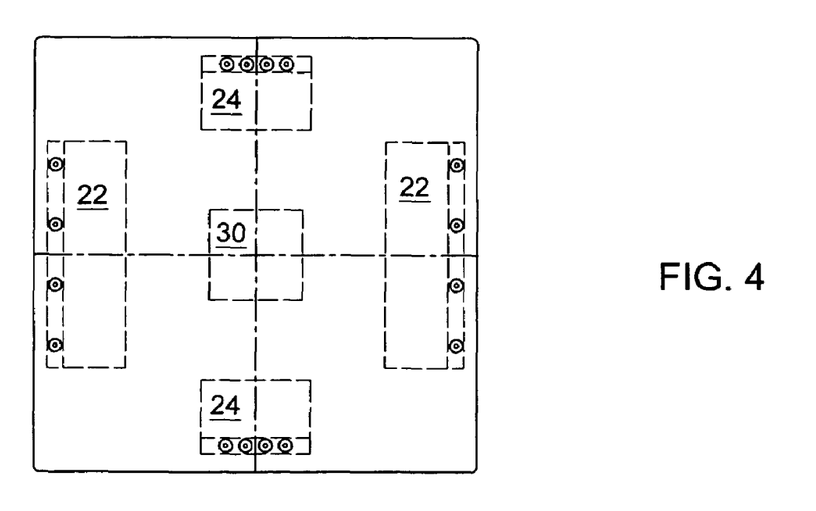
FIG. 4 is a schematic upper view of the device shown in FIG. 1.

As seen in FIG. 4, the legs 22 and 24 have different dimension in the direction along the edges 12 and 14 of the upper and lower plates 4 and 6. Namely, the legs 22 extend along the majority of the length of the upper and lower plates' edges 12, and the legs 24 extend along the minority of length of the edges 14 thereof. However, this difference is not necessary, and the legs may all have equal length, provided this length is shorter than the length of each of the edge 12 and 14.

The design of the peripheral legs 22 and 24 as well as their location in the device of the present invention should be chosen so as to ensure that the legs, on the one hand, are capable of required elastic deformation $\Delta H_{elast}$ under a high energy impact, and on the other hand, are strong enough to withstand, when in normal use during the life time of the vehicle, repeated loads exerted on the seat, while allowing a plurality of elastic movements of the seat which are essentially smaller than $\Delta H_{elast}$.

With reference to FIGS. 2, 3 and 4, the second energy absorbing mechanism 10 is in the form of a central leg 30 made of a material capable of progressive deformation. The material may be, for example, metal foam; a fiber reinforced composite structure, or the like. The central leg 30 has lower and upper ends 32 and 34, respectively, with the upper end 34 being spaced from the upper plate 6 to a distance h, which equals the designed extent $\Delta H_{elast}$ of elastic deformation of the legs 22 and 24. As shown, the leg 30 has a uniform square cross-sectional area. However, the cross-sectional shape of the leg 30 may be different, e.g. it may be rectangular, circular, or the like, and it may vary along the height of the leg.

The central leg 30 is provided with a relatively hard and thin resilient spacer 36 between the lower end 32 and the lower plate 4, and a relatively mild and thick resilient pad 38 between the upper end 34 and the upper plate 6.

When the device is mounted in a vehicle between its floor and seat, it serves as a support for the seat which, when in normal use, is capable of elastic movements along the axis X when an occupant is seated on the seat, the elastic movements being essentially smaller than $\Delta H_{elast}$. These movements are possible due to the specific design of the peripheral legs 22 and 24. The resilient pad 38 between the central leg 30 and the upper plate 6 protects the leg 30 from being damaged by these movements. When the vehicle is subjected to a high energy impact caused, for example, by a mine blast, the peripheral legs 22 and 24 will first undergo elastic deformation due to which the height of the device H will be reduced by $\Delta H_{elast}$, and then their plastic deformation will begin essentially simultaneously with progressive deformation of the central leg 30. The process of energy absorption will thereby be prolonged to reduce the acceleration transmitted to a seated occupant to a level not exceeding an acceptable level of acceleration for a constrained seated occupant during predetermined amount of time.

Several experiments were performed to verify that the above result is feasible with a device according to the present invention. One of the experiments was performed on a device having a design as described above, with the following parameters:

Upper and Lower Plates:

| | |
|---|---|
| Size - | 330 × 330 mm |
| Thickness - | 5 mm |
| Material - | Aluminum 7075T6 |
| Distance between the plates - | 161.7 mm |

Peripheral Legs (Legs 22 and 24 in FIGS. 1 to 4):

| | |
|---|---|
| Thickness - | 1.5 mm |
| Angle $\alpha$ - | 120° |
| Material - | Stainless Steel 304 |

Central Leg having Four Layers (Leg 30 in FIGS. 1 to 4):

| | |
|---|---|
| Height - | |
| Total - | 136 mm |
| 1-st layer - | 25 mm |
| 2-nd, 3-d and 4-th layers, each - | 37 mm |
| Size - | 75 × 75 mm |
| Material - | Aluminum Foam |

Spacer (Spacer 36 in FIGS. 1 to 4):

| | |
|---|---|
| Thickness - | 5 mm |
| Material - | Rubber, NEWPHARM, 70 SHOR |

Pad (Pad 38 in FIGS. 1 to 4):

| | |
|---|---|
| Thickness - | 20 mm |
| Material - | Rubber foam, EPOM, 30 SHOR |

Figure 5:
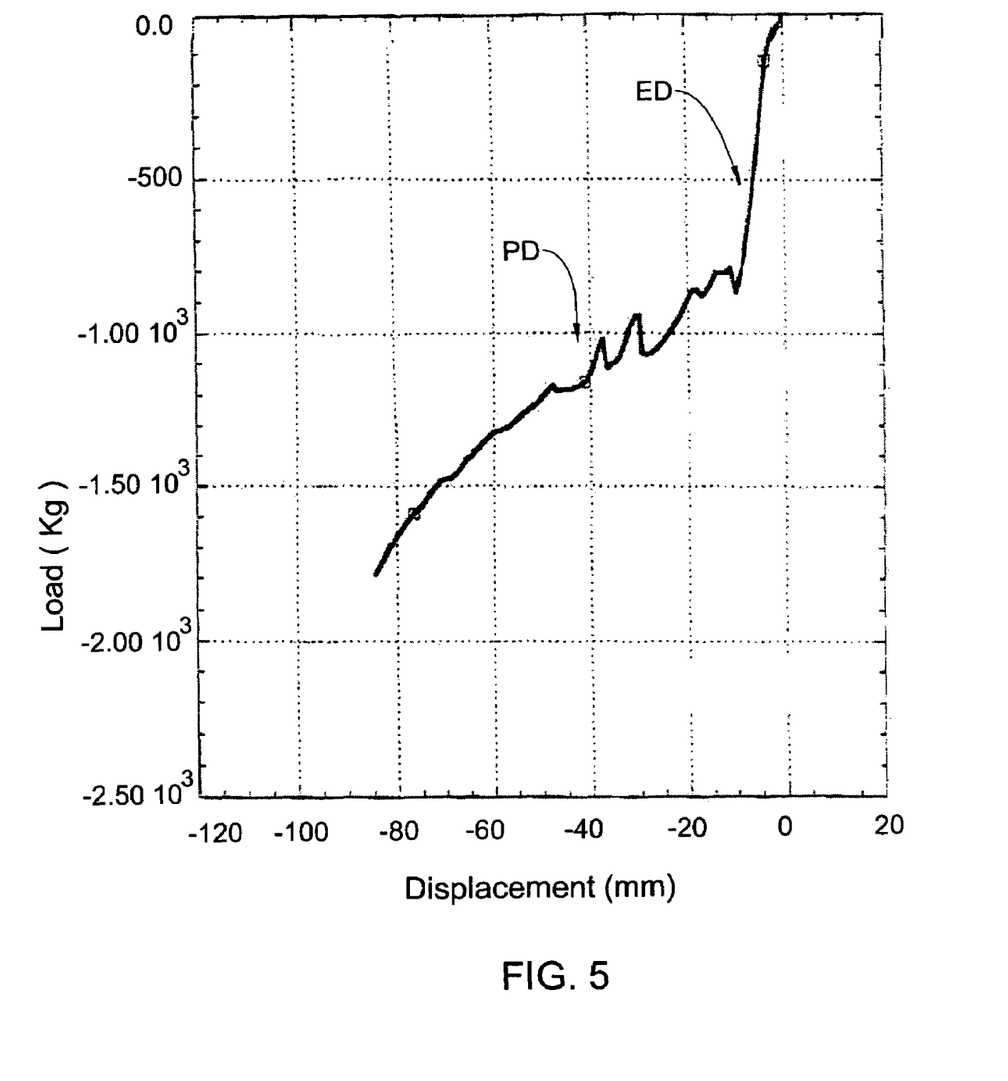
FIG. 5 is loading-displacement curve obtained in a compression test performed on a sample of a device according to the present invention.

The device with the above parameters was subjected to a compression test where compression load increasing up to about 2200 Kg during about 40 μsec was exerted on the device in the direction along its axis X. The loading-displacement curve obtained during the test is presented in FIG. 5, where section ED corresponds to the elastic deformation ($\Delta H_{elast}$) of about 10 mm of the peripheral legs and section PD corresponds to the simultaneous process of progressive compression of the central leg and plastic deformation of the peripheral legs.

The test results show that, within first 30 μsec, the tested device absorbs about 1800 Kg of force, and its height is reduced by 80 mm. This meets the requirement of maximum allowable acceleration of 18 g, which may be transmitted to a constrained seated occupant during first 30 μsec with a compression of the seat structure of up to 100 mm. The test results also show that the device does not undergo any non-elastic deformation under loads of up to 600-800 Kg, which means that it will be able to withstand, when necessary, heavy off-road driving conditions.

In addition to the above test, a multiple compression test has been performed on the device under loads of up to 400 Kg, and it appeared to withstand such a load about 50,000 times while maintaining the required elasticity, which means that the device is suitable for prolonged use under normal driving conditions.

The above description refers to only one example of a device according to the present invention, and this example may clearly be modified within the scope of the invention, by introducing features known to skilled persons in the art.

While the device 1 of the present invention provides predetermined advantageous patterns of deformation under loads urging the plates 4 and 6 against each other, the strength and rigidity of the device under other operational loads may be insufficient. For example, the device 1 may be too "soft" (compliant) under shear loads parallel to the edges 14, or may become distorted under loads urging plates 4 and 6 apart from each other. The embodiment below provides enhanced rigidity of the device in selected desirable directions.

Figure 6:
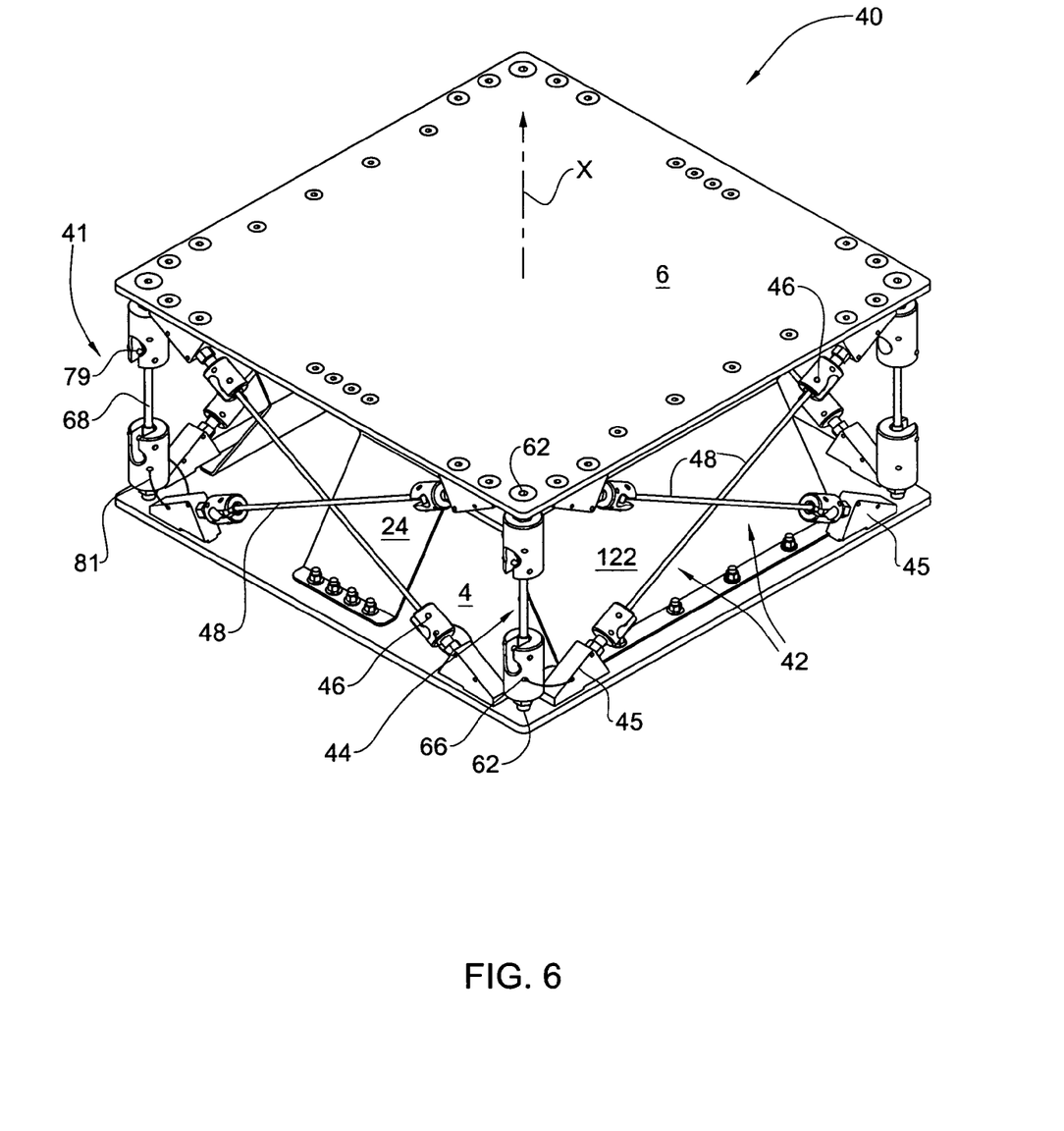
FIG. 6 is a perspective view of another example of an energy absorbing device, equipped with tension links.

With reference to FIG. 6, there is shown an energy absorbing device 40 similar to the device 1 of FIG. 1 but additionally equipped with a restriction mechanism 41 which comprises tension links of two types, diagonal link 42 and vertical link 44. Each tension link comprises two anchor elements, two tensioning elements and a tension cable which are slightly different in the two types of links.

Figures 7, 8:
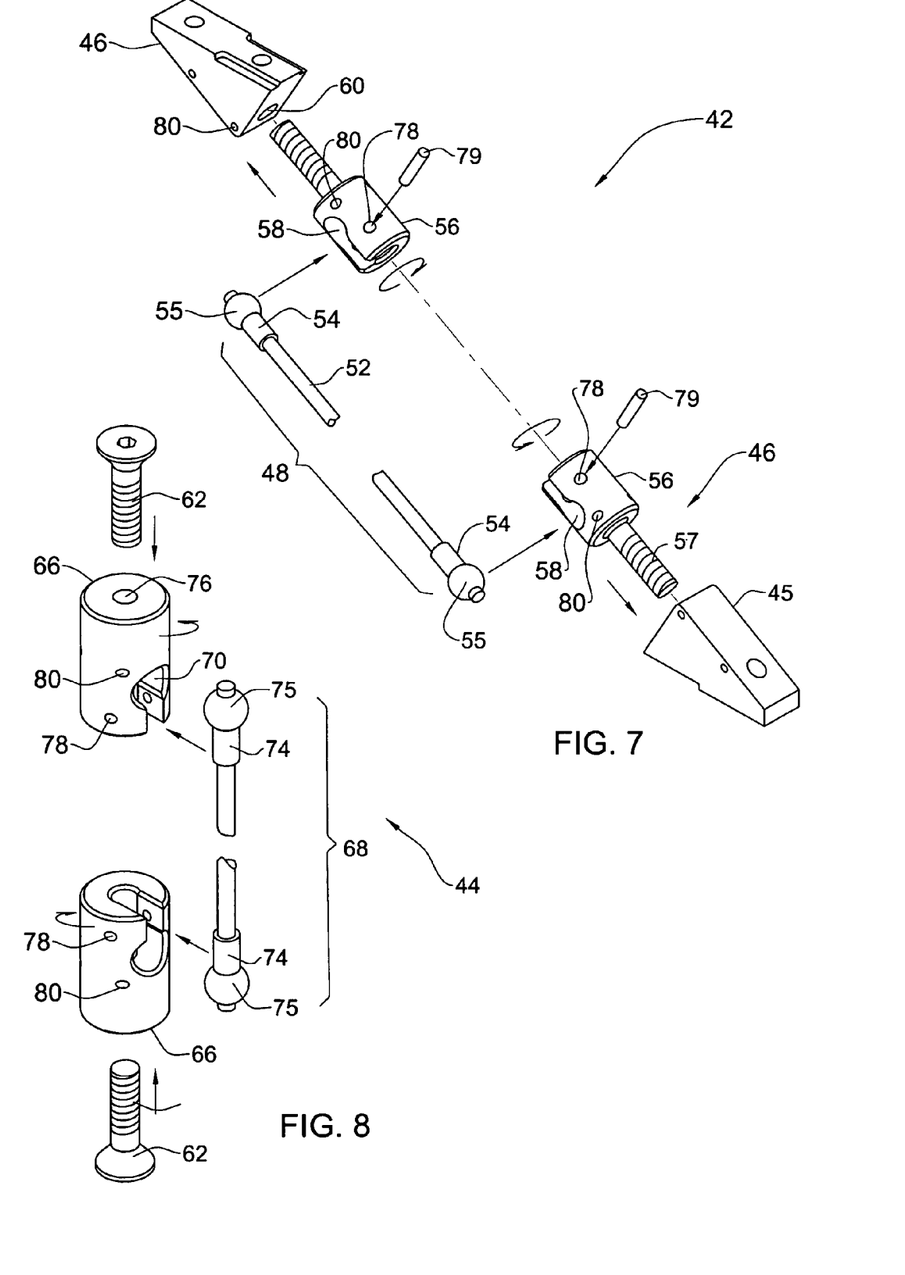
FIG. 7 is an exploded view of a diagonal tension link.
FIG. 8 is an exploded view of a vertical tension link.

With reference to FIG. 7, diagonal tension link 42 comprises two wedge-shaped boots (anchors) 45, two tensioning bolts 46 and a diagonal tension cable 48. Tension cable 48 comprises a length of twisted braided steel cable 52 and two cable thimbles 54 with ball-shaped heads 55 firmly fixed to the cable's ends. Tensioning bolts 46 have a cylinder socket 56 and a threaded tail 57. The socket 56 has a specially formed recess 58 with swollen bottom portion and lateral opening, such that a cable thimble 54 can be inserted therein laterally and captured securely when the cable 48 is pulled axially. The recess 58 however allows rotation of the thimble head 55. The boots 45 have threaded bores 60 matching the threaded tails 57, and are fixed by screws to each of the plates 4 and 6, close to plate corners.

With reference to FIG. 8, vertical tension link 44 comprises two anchor bolts 62, two tensioning nuts 66, and a vertical tension cable 68. The vertical tension cable 68, similarly to diagonal cable 48, comprises a length of twisted braided steel cable 72 and two cable thimbles 74 with ball-shaped heads 75 fixed to the cable's ends. Tensioning nuts 66 constitute cylinder sockets with a specially formed recess 70, similar to sockets 56 but adapted to accommodate thimbles 74. Tensioning nuts 66 have threaded bores 76 matching the anchor bolts 62. The latter are fixed by nuts in the corners of each of the plates 4 and 6.

Tensioning bolts 46, tensioning nuts 66, and wedge boots 45 have through off-center bores 78 for inserting locking pins 79 across the recess 58, and through bores 80 for inserting locking wire therein.

For assembly of the restriction mechanism 41, two tensioning bolts 46 are first slightly engaged in the threaded bores of two boots 45, one at the plate 4, the other at the plate 6, located approximately on a side diagonal of a parallelepiped defined by plates 4 and 6. Then thimbles 54 of one tension cable 48 are inserted in the recesses 58 of the tensioning bolts 46, and the tensioning bolts are further rotated to tighten the tension cable 48. Locking pins 79 are pressed into bores 78 to prevent thimbles 54 from disengaging. In this way, eight diagonal tension links 42 are assembled, two on each of the four lateral sides of the parallelepiped. Preferably, the tension links 42 are tightened uniformly, such that shear loads resulting from their tension are mutually balanced and do not affect other elements of the device.

In a similar way, two tensioning nuts 66 are screwed onto two opposing anchor bolts 62, thimbles 74 of the vertical tension cable 68 are engaged in the recesses 70, and the tensioning nuts 66 are further rotated to tighten the cable 68. Vertical tension links 44 are thus mounted along each lateral edge of the parallelepiped. The total load for pretension is about 100 to 200 Kg between the upper and the lower plates.

After adjusting the tension of the cable links 42 and 44, a piece of locking wire 81 is passed through each tensioning bolt 46 or nut 66 and an adjacent boot 45 and twisted in a ring so that accidental unscrewing of the tensioning elements is prevented.

The restriction mechanism 41 operates in the following way. In the case of sheer loads parallel to the plates 4 and 6, or in the case of torque about the axis X, diagonal links 42 restrict the relative displacement of the plates and provide considerable rigidity and stability to the device 101.

In the case of loads urging the plates 4 and 6 apart from one another, opposite to the direction of a possible blast, vertical links 44 are loaded and restrict the relative displacement of the plates, again providing the desirable rigidity to the device 101. However, if the diagonal links are disposed under steeper angle to the plates, the restriction mechanism may be operable without such vertical links.

It will be appreciated that since the cable links 42 and 44 are flexible, they work only in tension and do not interfere with the deformation of the device 101 along the axis X, when plates 4 and 6 are forced against each other, i.e. in the case of a blast under the vehicle. Furthermore, the diagonal links 42 may be made of elongated rods or strips, even integral with the plates 4 or 6, as far as such rods tend to be very flexible and unstable under axial compression. Thus they would resist only negligibly to bending and compression and would work substantially only in tension.

The seat support (device) 101 provides an unusual and advantageous combination of mechanical properties under different loads:
  on one hand, moderate elastic deformation, high rigidity and strength under normal operational loads, including off-road travel of the vehicle; and
  on the other hand, plastic (crush) deformation of predetermined pattern under an impulsive load such as mine blast.

The tensioning restricting mechanism allows the energy absorbing device to be used in motor vehicles, such as trucks etc. which are normally operated under automotive standards and regulations concerning the seats behavior under normal service and crush caused by accidents on off-road terrain, etc.

The above description represents only one example of restricting mechanism for a device according to the present invention. This example may clearly be modified within the scope of the invention, for example by providing only one tensioning bolt/nut per link, using thin rods, chains, wires, bands or knitted bands instead of cables, and other modifications known to skilled persons in the art. The restricting mechanism may be used with other types of energy-absorbing mechanisms.

The invention claimed is:

1. An energy absorbing device for reducing acceleration resulting from a force of a high energy impact acting on one side of said device in an impact direction, the device comprising a first plate at said one side, a second plate at the other side thereof, both plates being transverse to said impact direction, and an energy absorbing mechanism extending between the plates, wherein
said device further comprises a restriction mechanism associated with said two plates, adapted to restrict displacement of said first plate relative to said second plate at least in one direction different from said impact direction and to allow substantially free displacement of said first plate in said impact direction; and wherein
said device is adapted for use in a vehicle, the first plate being under a seat of an occupant of the vehicle and the second plate being attached to a floor of the vehicle.

2. The device of claim 1, wherein said restriction mechanism is adapted to restrict said displacement in a direction perpendicular to said impact direction.

3. The device of claim 1, wherein said restriction mechanism is adapted to restrict rotational displacement of said first plate about an axis parallel to said impact direction.

4. The device of claim 1, wherein said restriction mechanism is adapted to restrict said displacement opposite to said impact direction.

5. The device of claim 1, wherein said restriction mechanism is adapted to restrict said displacement in any direction different from said impact direction.

6. An enemy absorbing device for reducing acceleration resulting from a force of a high enemy impact acting on one side of said device in an impact direction, the device comprising a first plate at said one side, a second plate at an other side thereof, both plates being transverse to said impact direction, and an energy absorbing mechanism extending between the plates, wherein
said device further comprises a restriction mechanism connecting said two plates, adapted to restrict displacement of said first plate relative to said second plate at least in one direction different from said impact direction and to allow substantially free displacement of said first plate in said impact direction; and wherein said restriction mechanism comprises at least one mechanical link connecting said two plates, said at least one link being adapted to work substantially only in tension, such that said at least one link can restrict said displacement under either shear loads applied to the first plate relative to the second plate, or under axial loads urging the two plates apart from one another, or under both such shear and axial loads.

7. A device according to claim 6, comprising a plurality of such links disposed in various diagonal directions such that said plurality of diagonal links can restrict said displacement under shear loads applied in any direction.

8. A device according to claim 7, wherein said plurality of links are pre-tensioned.

9. A device according to claim 8, wherein said plurality of diagonal links are pre-tensioned such that shear loads exerted by said plurality of diagonal links on the two plates essentially balance each other.

10. A device according to claim 6, comprising a plurality of such links disposed in the impact direction.

11. A device according to claim 6, wherein said at least one link has pre-tensioning means.

12. A device according to claim 11, wherein said pre-tensioning means is a threaded nut and bolt pair.

13. A device according to claim 6, wherein said at least one link includes one of the following: flexible wire, twisted multi-wire cable, knitted cable, woven band, chain.

14. A device according to claim 6, wherein said at least one link is at least partially a thin rod or strip integral with one of the two plates.

15. An energy absorbing device for reducing acceleration resulting from a force of a high energy impact acting on one side of said device in an impact direction, the device comprising a first plate at said one side, a second plate at an other side thereof, both plates being transverse to said impact direction, and an enemy absorbing mechanism extending between the plates, wherein
said device further comprises a restriction mechanism connecting said two plates, adapted to restrict displacement of said first elate relative to said second plate at least in one direction different from said impact direction and to allow substantially free displacement of said first plate in said impact direction and wherein said device is adapted for use in a vehicle, the first plate being under a seat of an occupant of the vehicle and the second plate being attached to a floor of the vehicle.

16. An energy absorbing device for reducing acceleration resulting from a force of a high energy impact acting on one side of said device in an impact direction, the device comprising a first plate at said one side, a second plate at the other side thereof, both plates being transverse to said impact direction, and an energy absorbing mechanism extending between the plates, wherein
said energy absorbing mechanism comprising a first energy absorbing mechanism and a second energy absorbing mechanism, spaced from one another along a direction different from said impact direction; and wherein
said device further comprises a restriction mechanism associated with said two plates, adapted to restrict displacement of said first plate relative to said second plate at least in one direction different from said impact direction and to allow substantially free displacement of said first plate in said impact direction.

17. A device according to claim 16, wherein said energy absorbing mechanism comprises a first energy absorbing mechanism having a first dimension in the impact direction and capable of undergoing elastic deformation of a predetermined amount in the impact direction; and a second energy absorbing mechanism having a second dimension in the impact direction, which is smaller than the first dimension to a distance corresponding to said amount of elastic deformation, thereby allowing the second mechanism to be loaded with said force after the first mechanism has undergone said elastic deformation, said second mechanism comprising a material capable of progressive deformation.

18. A device according to claim 17, wherein the first mechanism is made of a material capable of undergoing plastic deformation simultaneously with said progressive deformation.

19. A device according to claim 17, capable of reduction of the acceleration transmitted to a seated occupant of a vehicle to a level not exceeding 18 g for a constrained seated occupant during 30 μsec, with the deformation of the device in the impact direction not exceeding 100 mm.

20. A device according to claim 17, wherein said first energy absorbing mechanism extending between the plates with its two ends attached to the plates, and the second energy absorbing mechanism attached to the second plate with its one end and having the other end spaced from the first plate to said distance corresponding to said amount of elastic deformation of the first element.

21. A device according to claim 17, wherein the first mechanism is in the form of a plurality of peripherally located spaced apart first energy absorbing elements surrounding a centrally disposed second energy absorbing mechanism.

22. A device according to claim 21, wherein the first energy absorbing elements are spaced from the second energy absorbing mechanism so that, when they are deformed, they do not contact the second mechanism.

23. A device according to claim 17, wherein the first mechanism has special deformation area or areas, about which its deformation takes place.

24. A device according to claim 17, wherein the second energy absorbing mechanism is in the form of at least one solid second energy absorbing element capable of progressive deformation.

25. A device according to claim 24, wherein the second mechanism is at least partially made of metal foam.

26. A device according to claim 25, wherein the metal foam is aluminum foam.

27. A device according to claim 20, wherein said second energy absorbing mechanism is provided with a resilient spacer adapted to damp forces that may be exerted on the lower plate of the device.

28. A device according to claim 17, wherein the second mechanism is provided with a resilient pad at an upper end of the mechanism, whose dimension in the impact direction equals said amount of elastic deformation.

\* \* \* \* \*

UNITED STATES PATENT AND TRADEMARK OFFICE
CERTIFICATE OF CORRECTION

PATENT NO. : 7,393,039 B2  
APPLICATION NO. : 11/081831  
DATED : July 1, 2008  
INVENTOR(S) : Ravid et al.

It is certified that error appears in the above-identified patent and that said Letters Patent is hereby corrected as shown below:

Column 9, Claim 6, Line 43,

Please delete "An enemy absorbing"
and
replace with

-- An energy absorbing --

Column 9, Claim 6, Line 44,

Please delete "of a high enemy impact"
and
replace with

-- of a high energy impact --

Column 10, Claim 15, Line 26,

Please delete "and an enemy absorbing"
and
replace with

-- and an energy absorbing --

Column 10, Claim 15, Line 30,

Please delete "said first elate relative"
and
replace with

-- said first plate relative --

UNITED STATES PATENT AND TRADEMARK OFFICE
CERTIFICATE OF CORRECTION

PATENT NO. : 7,393,039 B2
APPLICATION NO. : 11/081831
DATED : July 1, 2008
INVENTOR(S) : Ravid et al.

It is certified that error appears in the above-identified patent and that said Letters Patent is hereby corrected as shown below:

Column 10, Claim 15, Line 33,

Please delete "impact direction and wherein"
and
replace with

-- impact direction; and wherein --

Signed and Sealed this

Sixth Day of January, 2009

JON W. DUDAS
*Director of the United States Patent and Trademark Office*